(12) United States Patent
Norton et al.

(10) Patent No.: US 11,316,789 B2
(45) Date of Patent: Apr. 26, 2022

(54) SYSTEM AND METHOD FOR SELECTING DATA ROUTING PATHS HAVING REDUCED LATENCIES IN A DISTRIBUTED COMPUTER NETWORK

(71) Applicant: NOIA Network Limited, Palo Alto, CA (US)

(72) Inventors: William B. Norton, Palo Alto, CA (US); Jonas Simanavicius, Vilnius (LT)

(73) Assignee: Syntropy Network Limited, Palo Alto, CA (US)

( * ) Notice: Subject to any disclaimer, the term of this patent is extended or adjusted under 35 U.S.C. 154(b) by 0 days.

(21) Appl. No.: 17/153,163

(22) Filed: Jan. 20, 2021

(65) Prior Publication Data

US 2021/0250297 A1     Aug. 12, 2021

Related U.S. Application Data

(63) Continuation-in-part of application No. 17/132,193, filed on Dec. 23, 2020.

(60) Provisional application No. 62/972,126, filed on Feb. 10, 2020.

(51) Int. Cl.
*H04L 47/12* (2022.01)
*H04L 43/0894* (2022.01)

(52) U.S. Cl.
CPC .......... *H04L 47/12* (2013.01); *H04L 43/0894* (2013.01)

(58) Field of Classification Search
CPC ... H04L 45/42; H04L 43/0858; H04L 43/106; H04L 45/22; H04L 47/12; H04L 43/0894
See application file for complete search history.

(56) References Cited

U.S. PATENT DOCUMENTS

2003/0123436 A1* 7/2003 Joseph ................ H04M 7/1285
370/352
2014/0177460 A1* 6/2014 Keskkula ............ H04L 45/3065
370/252
2016/0019546 A1* 1/2016 Eisen ...................... G06F 21/44
705/44

\* cited by examiner

*Primary Examiner* — Thomas J Dailey
*Assistant Examiner* — Aye M Aung
(74) *Attorney, Agent, or Firm* — SV Patent Service

(57) ABSTRACT

A method for autonomously selecting data routing path by a distributed system includes forming a pulse group comprising a plurality of nodes in a computer network, automatically measuring one-way latencies between nodes in the pulse group, recording the one-way latencies in a one-way latency matrix, automatically determining a lower-latency data routing path from a first node to a second node through a relay node using in the one-way latency matrix. The lower-latency data routing path has a lower sum of one-way latencies from the first node to the second node via the relay node than the one-way latency for the direct path between from the first node to the second node. Data is sent from the first node to the second node via the relay node along the lower-latency data routing path. A payment transfer is automatically recorded in response to the data transmission along the lower-latency data routing path.

17 Claims, 13 Drawing Sheets

|   | To A | To B | To C | To D | To E |
|---|---|---|---|---|---|
| From A |   |   |   | 51 |   |
| From B |   |   |   | 53 |   |
| From C | 50 | 34 |   | 100 | 91 |
| From D |   |   | 85 |   |   |
| From E |   |   |   | 25 |   |

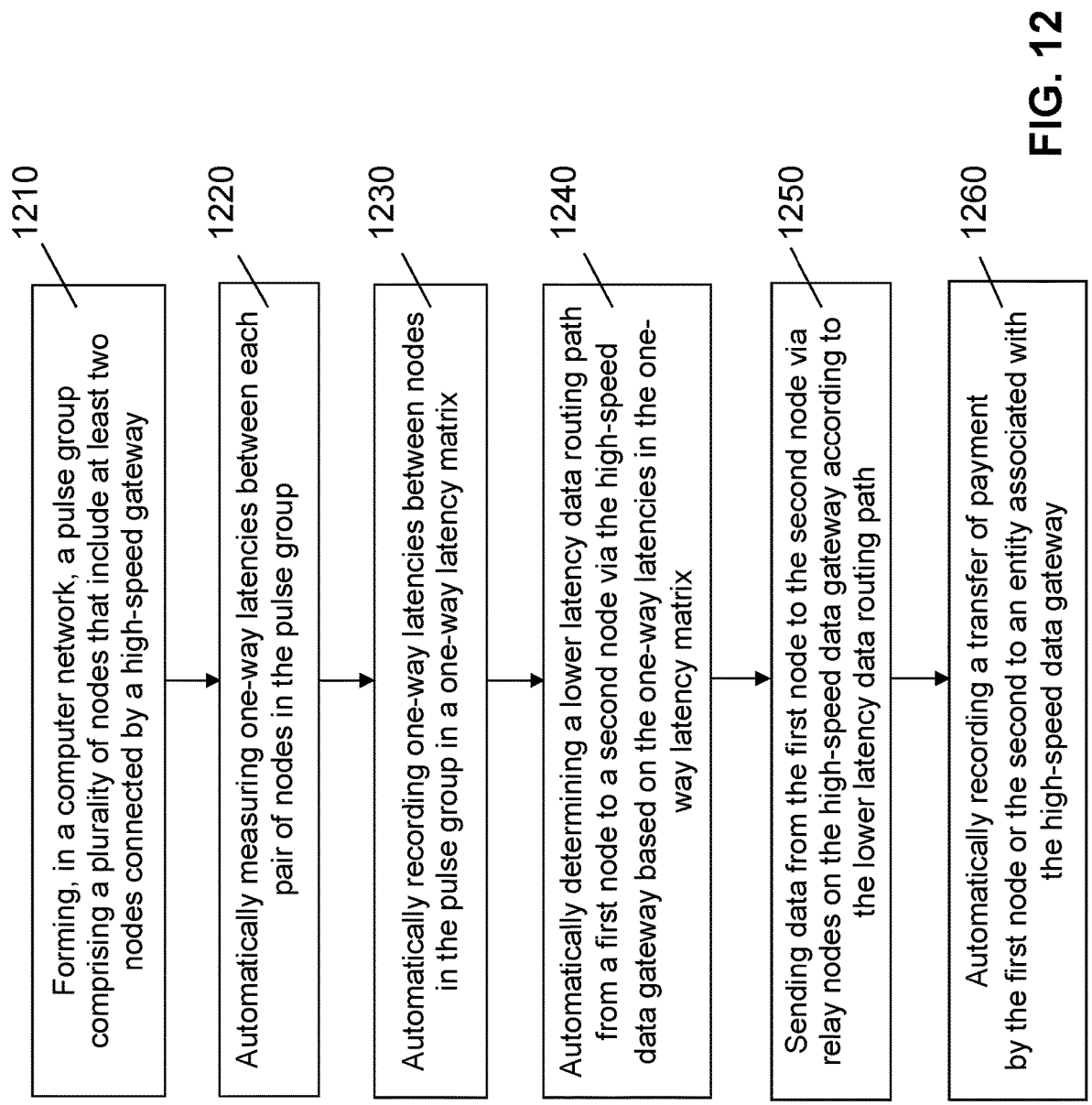

US 11,316,789 B2

SYSTEM AND METHOD FOR SELECTING DATA ROUTING PATHS HAVING REDUCED LATENCIES IN A DISTRIBUTED COMPUTER NETWORK

FIELD OF THE INVENTION

The present invention relates generally to the field of computer network, and in particular, to improving performance of data communications over computer networks such as the Internet.

BACKGROUND OF THE INVENTION

The current Internet transit services are vulnerable to eavesdropping, and fail to route around partially degraded networks, leading to suboptimal network performance.

Conventional technologies in the dynamically routed internet field primarily operate at the Network Layer (Layer 3) by selecting a best path for traffic based on the shortest path between the data sending node and the destination node. The conventional technologies also do not take into account of the network degradation condition. Related technologies in the Virtual Private Networking (VPN) provide protection from eavesdropping, but do not route around degraded network paths.

There is therefore a need for computer network technologies with improved transmission speed, more security, and higher reliability (less data loss, less jitters, etc.).

SUMMARY OF THE INVENTION

In one general aspect, the present invention relates to a method for autonomously selecting data routing path over a computer network by a distributed system that includes: forming a pulse group comprising a plurality of nodes in a computer network, automatically measuring one-way latencies between nodes in the pulse group, which includes a first one-way latency for a direct path from a first node to a second node, automatically recording, in a one-way latency matrix, the one-way latencies between nodes in the pulse group, automatically determining a lower-latency data routing path from the first node to the second node based on the one-way latencies in the one-way latency matrix, wherein the lower-latency data routing path passes through a first relay node in the pulse group, wherein the lower-latency data routing path has a lower sum of one-way latencies from the first node to the second node via the first relay node than the first one-way latency, and sending data from the first node to the second node via the first relay node along the lower-latency data routing path, wherein a payment transfer is automatically recorded in response to sending data along the lower-latency data routing path.

Implementations of the method may include one or more of the following. The payment transfer by the first node or the second node to the first relay node can be automatically validated and recorded by a plurality of validator nodes using blockchain technologies. The lower-latency data routing path can have a total latency defined by a sum of one-way latencies from the first node to the first relay node and from the first relay node to the second node. The pulse group can include a second relay node, wherein the lower-latency data routing path passes through the first replay node and the second relay node. The lower-latency data routing path can have a total latency defined by a sum of one-way latencies from the first node to the first relay node, from first relay node to the second relay node, and from the second relay node to the second node. The first relay node and the second relay node can be connected by a high-speed data gateway, wherein a one-way latency between the first relay node and the second relay node is less than half of an average of the one-way latency values in the pulse group. Automatically measuring one-way latencies between nodes in the pulse group can include: automatically sending a plurality of pulse messages from the first node in the pulse group to other nodes in the pulse group, receiving one of the plurality of pulse messages by the second node in the pulse group, wherein the one of the plurality of pulse messages includes a first timestamp associated with a sending time by the first node, wherein the one of the plurality of pulse messages is received at a reception time associated with a second time stamp, and automatically computing the first one-way latency for the direct path from the first node to the second node based on the first time stamp and the second time stamp, wherein the first one-way latency is recorded in the one-way latency matrix. The first one-way latency from the first node to the second node can be automatically computed at the second node, wherein the first one-way latency is automatically updated in the one-way latency matrix by the second node. At least some computer clocks at the plurality of nodes in the pulse group can have skews relative to each other, wherein automatically determining a lower-latency data routing path from the first node to the second node based on the one-way latencies in the one-way latency matrix is independent of the skews between the some of the computer clocks at the plurality of nodes in the pulse group. The plurality of pulse messages can be formed by single data packets. The pulse group can be initiated by one of the plurality of nodes as a genesis node, wherein the method further include inviting nodes in the plurality of nodes by the genesis node to connect to the genesis node to form the pulse group.

In another general aspect, the present invention relates to a non-transitory computer-readable medium storing a plurality of instructions which, when executed by one or more processors, cause the one or more processors to perform operations a computer network, the operations comprising: forming a pulse group comprising a plurality of nodes in a computer network, automatically measuring one-way latencies between nodes in the pulse group, which includes a first one-way latency for a direct path from a first node to a second node, automatically recording, in a one-way latency matrix, the one-way latencies between nodes in the pulse group, automatically determining a lower-latency data routing path from the first node to the second node based on the one-way latencies in the one-way latency matrix, wherein the lower-latency data routing path passes through a first relay node in the pulse group, wherein the lower-latency data routing path has a lower sum of one-way latencies from the first node to the second node via the first relay node than the first one-way latency; and sending data from the first node to the second node via the first relay node along the lower-latency data routing path, wherein a payment transfer is automatically recorded in response to sending data along the lower-latency data routing path.

In another general aspect, the present invention relates to a computer system for autonomously selecting data routing path over a computer network, that includes a server configured to send instructions to a plurality of nodes in a computer network and a memory storing the instructions that, when executed by the one or more processors at the plurality of nodes, cause the plurality of nodes to form a pulse group comprising a plurality of nodes in a computer network, automatically measure one-way latencies between nodes in the pulse group, which includes a first one-way latency for a direct path from a first node to a second node, automatically record, in a one-way latency matrix, the one-way latencies between nodes in the pulse group, automatically determine a lower-latency data routing path from the first node to the second node based on the one-way latencies in the one-way latency matrix, wherein the lower-latency data routing path passes through a first relay node in the pulse group, wherein the lower-latency data routing path has a lower sum of one-way latencies from the first node to the second node via the first relay node than the first one-way latency, and send data from the first node to the second node via the first relay node along the lower-latency data routing path, wherein a payment transfer is automatically recorded in response to sending data along the lower-latency data routing path.

In another general aspect, the present invention relates to a method for autonomous selection of a data routing path in a computer network, that includes: forming a pulse group comprising a plurality of nodes in a computer network, automatically sending a plurality of pulse messages from a first node in the pulse group to other nodes in the pulse group, receiving one of the plurality of pulse messages by a second node in the pulse group, wherein the one of the plurality of pulse messages can include a first timestamp associated with sending time by the first node, wherein the one of the plurality of pulse messages can be received at a reception time associated with a second time stamp, automatically computing a first one-way latency for a direct path from the first node to the second node based on the first time stamp and the second time stamp, automatically recording one-way latencies between each pair of nodes in the pulse group in a one-way latency matrix, wherein the one-way latencies includes the first one-way latency, and automatically determining a lower-latency data routing path from the first node to the second node based on the one-way latencies in the one-way latency matrix, wherein the data routing path can include at least a relay node in the pulse group, wherein the lower-latency data routing path has a lower sum of one-way latencies from the first node to the second node via the relay node than the first one-way latency.

In another general aspect, the present invention relates to a non-transitory computer-readable medium storing a plurality of instructions which, when executed by one or more processors, cause the one or more processors to perform operations a computer network. The operations include: forming a pulse group comprising a plurality of nodes in the computer network, automatically sending a plurality of pulse messages from a first node in the pulse group to other nodes in the pulse group, receiving one of the plurality of pulse messages by a second node in the pulse group, wherein the one of the plurality of pulse messages can include a first timestamp associated with sending time by the first node, wherein the one of the plurality of pulse messages can be received at a reception time associated with a second time stamp, automatically computing a first one-way latency for a direct path from the first node to the second node based on the first time stamp and the second time stamp, automatically recording one-way latencies between each pair of nodes in the pulse group in a one-way latency matrix, wherein the one-way latencies can include the first one-way latency, and automatically determining a lower-latency data routing path from the first node to the second node based on the one-way latencies in the one-way latency matrix, wherein the data routing path includes at least a relay node in the pulse group, wherein the lower-latency data routing path can have a lower sum of one-way latencies from the first node to the second node via the relay node than the first one-way latency.

In another general aspect, the present invention relates to a computer system for providing autonomous selection of a data routing path in a computer network, that includes: a server that can send instructions to a plurality of nodes in a computer network and a memory storing the instructions that, when executed by the one or more processors at the plurality of nodes, can cause the plurality of nodes to: form a pulse group comprising a plurality of nodes in the computer network, automatically send a plurality of pulse messages from a first node in the pulse group to other nodes in the pulse group; receive one of the plurality of pulse messages by a second node in the pulse group, wherein the one of the plurality of pulse messages can include a first timestamp associated with sending time by the first node, wherein the one of the plurality of pulse messages is received at a reception time associated with a second time stamp, automatically compute a first one-way latency for a direct path from the first node to the second node based on the first time stamp and the second time stamp, automatically record, in a one-way latency matrix, one-way latencies between each pair of nodes in the pulse group, wherein the one-way latencies can include the first one-way latency, and automatically determine a lower-latency data routing path from the first node to the second node based on the one-way latencies in the one-way latency matrix, wherein the data routing path can include at least a relay node in the pulse group, wherein the lower-latency data routing path has a lower sum of one-way latencies from the first node to the second node via the relay node than the first one-way latency.

The present disclosure describes a collection of distributed computer systems connected over an Internet that acts as a single autonomous cryptographically-secured overlay relay network. A collection of control and pulse messages exchanged between computers can dynamically form the computers into optimal groupings called pulse groups. One-way packet latencies are continually measured between the nodes within a pulse group in a public Internet or a private Internet. The continual measurements create a distributed full-mesh one-way latency matrix that is shared with all the nodes in the pulse group.

The disclosed systems, non-transitory computer-readable medium, and methods identify where a better performing encrypted network path exists through an intermediary relay node based on the distributed full-mesh one-way latency matrix. Public cryptographic keys are propagated across potential relay nodes and endpoints. The end systems can bypass their network providers' direct route to route their communications via a better performing encrypted application-layer path. The better performing network path via one or more relay nodes has lower latency, loss, jitters, etc. than the direct path between the end systems.

Machine learning and heuristics can be used to dynamically form a node group (i.e. pulse group) to accommodate fluctuations in offered network load. One-way packet latencies are autonomously and continually measured in both directions between each pair of nodes within a pulse group.

One advantage of the disclosed systems, non-transitory computer-readable medium, and methods is that their operations can measure and find the faster path between any internet-connected computers without the requirement of clock synchronization.

Another advantage of the disclosed systems and methods is that more secure communications can be provided by "spraying" data traffic across similar latency paths to increase the difficulty of capturing encrypted traffic for off-line analysis.

By managing the population of pulse groups, the disclosed systems and methods provide a buffer to the overall network load. Whenever or wherever a computer network is overburdened with traffic and experiencing high latencies, the disclosed systems and methods can autonomously identify alternative routing path and alleviate the traffic latency or congestion, which result in more consistent and reliable in the network's performance.

Moreover, the disclosed systems and methods can provide a more reliable data communications over a network. An end-system experiencing high packet loss can spray the same packet continuously across available paths, to maximize the chance of one of the packets make it through to the destination of the communication.

Furthermore, a simple directory service can facilitate the establishment and validation of secure end-to-end network connections in a global computer network.

The better performing alternative paths can go through one or more relay nodes between the initiation node and the destination node of a data transmission. Yet another advantage of the disclosed systems and methods is that mechanisms are established to encourage nodes to participate in serving as the relay nodes to provide the alternative routing paths for data transmissions. An incentive system can be set up for the relay nodes to be compensated for their participating services. The nodes that transmitted data can make a payment to the relay nodes used in the data transmission. The payment can be recorded in a secure and transparent method. Moreover, premium data transmission services can be provided by nodes connected to a high-speed data gateway.

BRIEF DESCRIPTION OF THE DRAWINGS

FIG. 2 shows an exemplified one-way latency (OWL) matrix that includes measured OWL values from each pair of nodes in a pulse group and the selection of better performing data routing paths in accordance with some embodiments of the present invention.

FIG. 12 is a flowchart for the formation of a pulse group, the latency measurements, the selection of better performing routing paths including a premium data routing path in a pulse group, and the recordation of transactions for using and providing better performing data routes in accordance with some embodiments of the present invention.

DETAILED DESCRIPTION OF THE INVENTION

To overcome the problems faced by the conventional network routing technologies, the present invention provides a decentralized system that continually measures latencies in the computer network and can dynamically determine better performing paths between nodes in the computer network based on the up-to-date measured latencies.

Figure 1A:
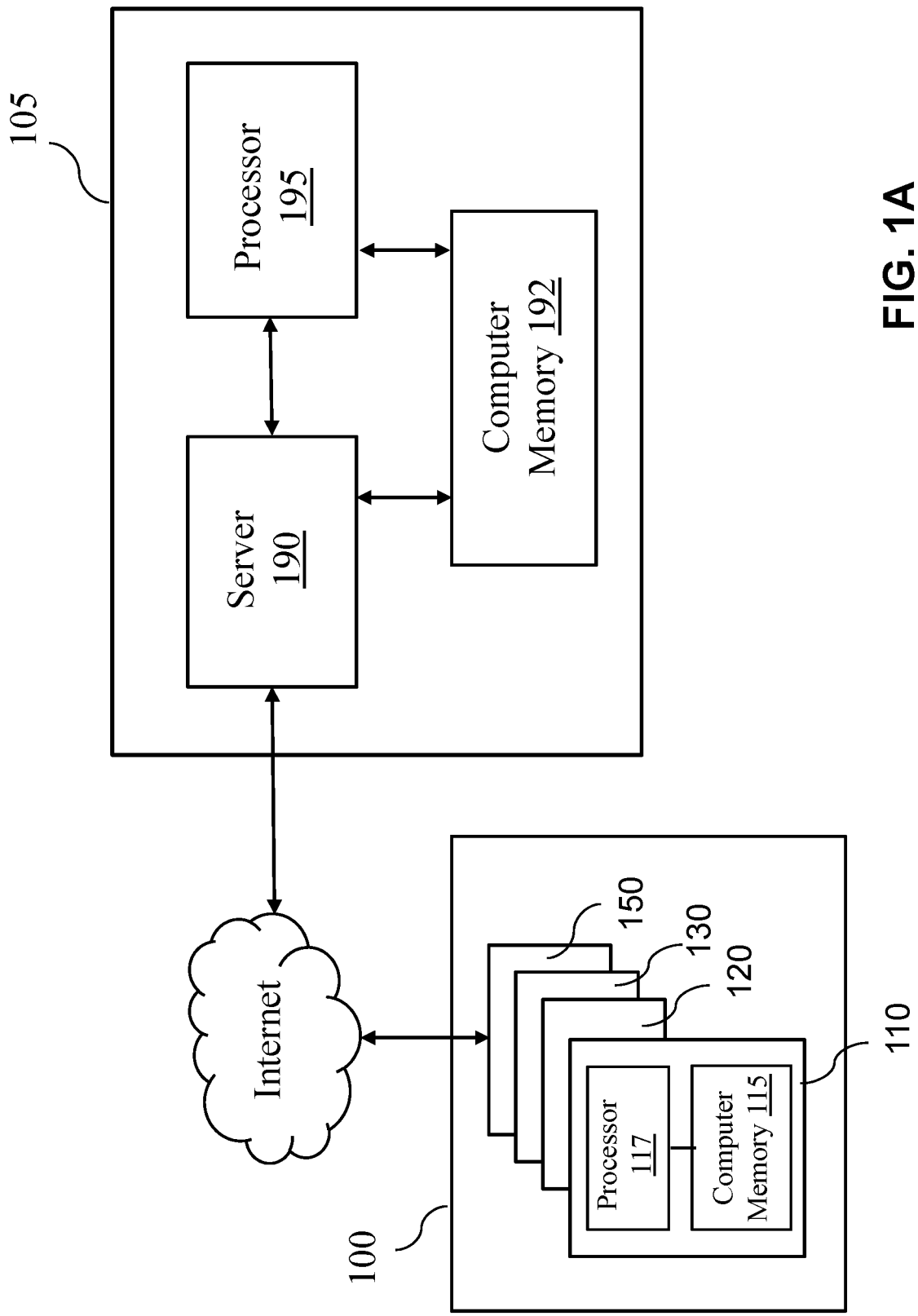
FIG. 1A shows a protocol-instruction provider computer system that provides codes for the formation and autonomous operations of pulse groups in a computer network in accordance with some embodiments of the present invention.
Figure 1B:
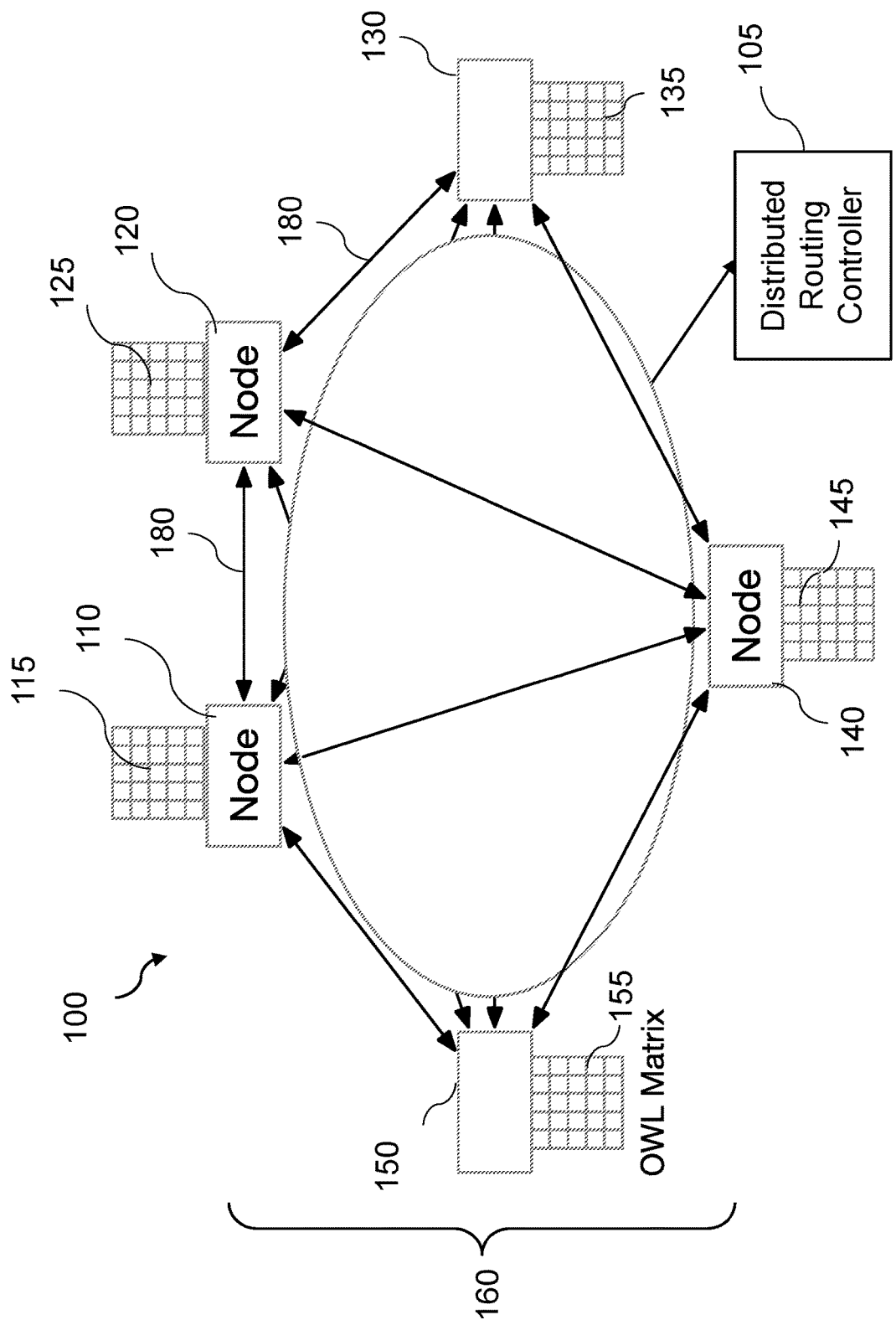
FIG. 1B illustrates connections and latency measurements between the computer nodes in a pulse group in accordance with some embodiments of the present invention.

In some embodiments, referring to FIGS. 1A and 1B, a distributed routing controller 105 (i.e. a protocol-instruction provider system) includes a server 190, a computer memory 192, and a processor 195, in connection with a computer network 100 via the Internet. The computer network 100 includes a collective of interconnected computers or nodes 110-150. The computer memory 192 stores computer codes that include instructions that define a distributed autonomous routing protocol, which enable nodes in the computer network 100 to form a group for continual measurements of data-transmission latencies and for determining better performing data routing pathways among a group nodes such as nodes 110-150.

The nodes 110-150 can receive the above described computer codes that contain the distributed autonomous routing instructions via download from the distributed routing controller 105. The node 110 can include a computer memory 115 that stores the computer codes and a processor 117 that executes the computer codes and implement instructions under the distributed autonomous routing protocol. Once the computer codes are installed on the respective computers, the nodes 110-150 are formed into a pulse group 160 according to the distributed autonomous routing protocol, which establishes secure communications among the nodes 110-150 in the pulse group 160.

The distributed routing controller 105 can be a private service provider that originally develops the distributed autonomous routing protocol. In some embodiments, the computer codes can be implemented as dockers that are installed at each of the node computers within a pulse group. The dockers enable compartmentalization of the node computers, which allows the instructions for the distributed autonomous routing protocol to be executed without interfering with other operations of the node computers. The distributed routing controller 105 can be responsible for managing and updating versions of the dockers. To ensure proper operations, all the nodes 110-150 will run the same version of the computer codes to execute the instructions for the distributed autonomous routing protocol. In some embodiments, the above described computer codes are distributed and updated using encrypted software.

The distributed routing controller 105 can also be implemented within a file repository system that is private or open to the public. In one implementation, the file repository system can be a public file repository; the original computer codes are provided by an entity that develops or establishes the distributed autonomous routing protocol. A portion of the computer codes can be contributed by many users or agents in the form of open source. Publically contributed codes can help the expansion and applications of pulse groups and the accomplishing faster and more reliable network routing. The distributed routing controller 105 can further include a commercial service provider that facilitates formation and/or maintenance of the pulse groups, and identification of better performing routing paths between nodes.

Under the instructions of the distributed autonomous routing protocol in the installed computer codes, the nodes 110-150 continually send pulse messages comprising the nodes' state information to each other in peer-to-peer connections 180. The state information includes a time stamp associated with the sending time of a pulse message sent by a particular node (e.g. 110) in the pulse group 160. In the present disclosure, the tem "pulse message" refers to the messages regularly sent between peer nodes in a common pulse group. Optionally, the state information can also include reception time stamps of the pulse messages previously received by the particular node (e.g. 110) from other nodes (i.e. 120-150).

One-way latencies are calculated by subtracting the reception time stamp by the sending time stamp of each pulse message in a uni-direction between a pair of nodes in the pulse group 160. In a pulse group comprising an integer n number of nodes, $n*(n-1)$ number of one-way latencies are continually measured and calculated for the pulse group. The One-Way Latencies (OWL) can be calculated by receiver nodes and shared with all members of the pulse group 160. Specifically, each node can be responsible for updating the OWL values of the one way communications received by that node. For example, referring to FIG. 2, the node D is responsible for updating the OWL values in the column "To D" in the OWL matrix 200. In FIG. 2, nodes A-E can respectively represent nodes 110-150 in FIGS. 1A and 1B.

The pulse messages can be light weight and adds very little traffic overhead to the computer network. In some embodiments, each of the pulse messages can include a single data packet that contains the state information such as the first time stamp. The state information contained in pulse messages can be used for measurement purposes, that is, for recording time stamps and for calculating latencies. In some embodiments, as described below in conjunction with FIG. 6, pulse messages can carry information for other operations of the pulse groups as well as for applications.

All the measured one-way latencies within the pulse group 160 are reported by the nodes 110-150 to the pulse group 160. The measured OWL values are combined and tabulated in OWL matrices (or OWL tables) 115, 125, 135, 145, 155, which are stored in computer memories of the nodes 110-150. The OWL matrices (or OWL tables) 115, 125, 135, 145, 155 are continually updated using the latest measured OWL values and shared among the nodes 110-150 in the pulse group 160. Thus each node 110-150 has a full-mesh real-time one-way latency matrix within its pulse group 160.

The computer network 100 can include a public network, or a private network, or a combination of both. In a public network, once a host computer node sets up a pulse group, any node in the public network (e.g. the Internet) can connect to one of the nodes in the pulse group by receiving the computer codes containing the distributed autonomous routing protocol to join the pulse group. In a private network, one genesis node (such as node 110 in FIGS. 1A and 1B) starts a pulse group by inviting a few nodes to join a pulse group. As shown in FIG. 1A, the genesis node such as node 110 includes the computer memory 115 that stores the computer codes and the processor 117 that executes the computer codes and implements instructions under the distributed autonomous routing protocol. The genesis node is part of the pulse group and it manages the population in its pulse group such as additions of nodes to the pulse group and deletions of nodes from the pulse group.

An important advantage of the presently disclosed system and method is that clock synchronization is not required among the nodes 110-150 in the pulse group 160. The clocks of the nodes 110-150 can have significant skew or offsets from each other, which will not affect the determination and the selection of the better routing paths among the nodes 110-150 in the pulse group 160.

In some embodiments, referring to FIG. 2, measured one-way latency values in a pulse group comprising nodes A-E are tabulated in a distributed full-mesh OWL matrix 200. The one way latencies from each of the five nodes A-E to other nodes result in 20 latency values ($n(n-1)$, wherein the exemplified n number of nodes in the pulse group is 5) in the OWL matrix 200. For examples, the latencies from node A, node B, node C and node E to node D are respectively 51, 53, 100, and 25 (msec.); the latencies from node C to node A, node B, node D and node E are respectively 50, 34, 100, and 91 (msec.). As discussed above, in one implementation, the OWL values in column "To A" are calculated and updated by node A; the OWL values in column "To B" are calculated and updated by node B, and so on. Moreover, latencies between two nodes can be different in forward and reverse directions. For example, the latency from node C to node D is 100 msec. and the latency from node D to node C is 85 msec.

It should be noted that the latency numbers, the number of nodes with a pulse group, the number of pulse groups, and specific exemplified configurations in FIGS. 1A-6 are used only for the purpose of illustrating the disclosed systems and methods, which should not limit the scope of the disclosed invention.

It should be further noted that the OWL values in the OWL matrix 200 are raw latency values derived from measured timestamps of the different node computers that are generally not synchronized. These raw latency values can be positive or negative, and the values can be significantly different from the true latency values measured between nodes having synchronized clocks.

In some embodiments, the OWL matrix 200 can be used as a routing table for determining a better performing path between two nodes within the pulse group. The distributed autonomous routing protocol contained in the computer codes downloaded from the distributed routing controller 105 enables autonomous calculations and determinations of better performing paths within the pulse group. In one aspect, the better performing data routing path is measured by the lower or the lowest total latency from the sending node, via one or more relay or intermediary nodes, to the destination node. The total latency is the sum of the latencies of all node-to-node transmission segments along the routing path.

From the OWL matrix 200, the direct routing path (i.e. the shortest path) from node C to node D, which is recommended by a conventional centralized Internet protocol-instruction provider, has a latency of 100 msec. In contrast, the presently disclosed systems and methods can improve the performance of the data routing from node C to node D by allowing additional intermediary or relay nodes between node C and node D. Using the OWL matrix 200, the presently disclosed methods explore and evaluate total latencies along other possible routing paths. For example, the path from node C to node A then from node A to node D has a total latency of 50+51=101 msec.; the path from node C to node E then from node E to node D has a total latency of 91+25=116 msec. Two above alternative paths would result in slower data transmissions, which are not good alternatives to the direct path. A better performing data routing path is found using node B as a relay node: the segments of node C to node B and then from node B to node D have a combined latency value of 34+53=87 msec., which is below the 100 msec. latency value of the direct path from node C to node D. Thus the path using node B in the pulse group as a relay node provides decreased latency comparing to conventional methods. In some embodiments, a better performing path can also include two or more relay nodes between the sending node and the destination node.

In the above example, the better performing routing path is independent of clock skews. For example, if the clock at node D is skewed by minus 50 msec., the latencies from node A, node B, node C and node E to node D would now be respectively 1, 3, 0, and −25 (msec.); the latency values in the column to node D are all shifted down by 50 msec. The better performing routing path from node C to node D will still be from node C to node B, then from node B to node D because all alternative paths have their respective summed latency values all shifted down by the same amount (i.e. 50 msec. of latency time). It should be noted that negative latency values are allowed in the OWL matrix, which do not affect the determination of the better performing routing paths as described above.

Figure 3:
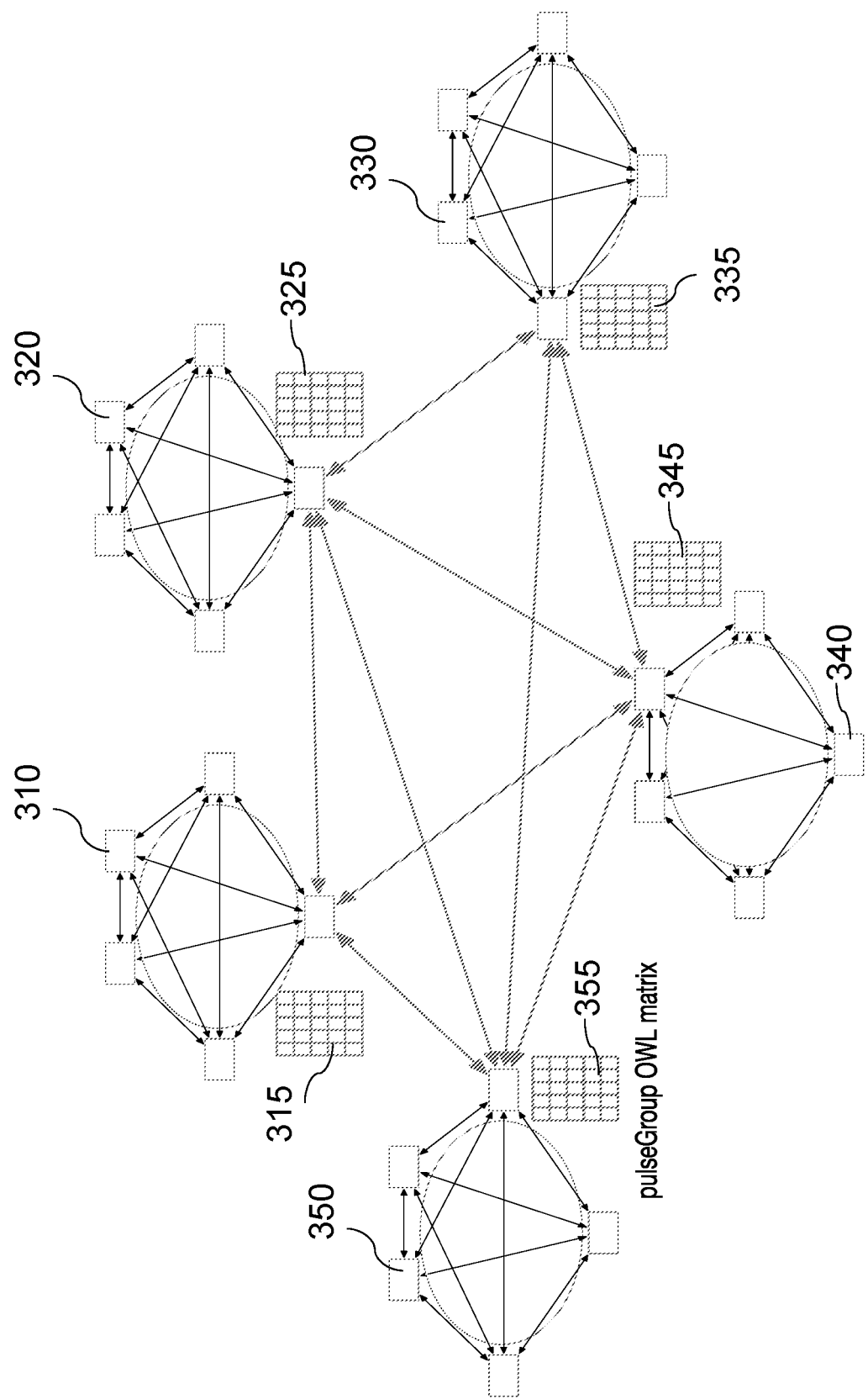
FIG. 3 depicts an exemplified schematic diagram showing multiple pulse groups having updated OWL matrices within and between pulse groups for providing global directory service in accordance with some embodiments of the present invention.
Figure 4:
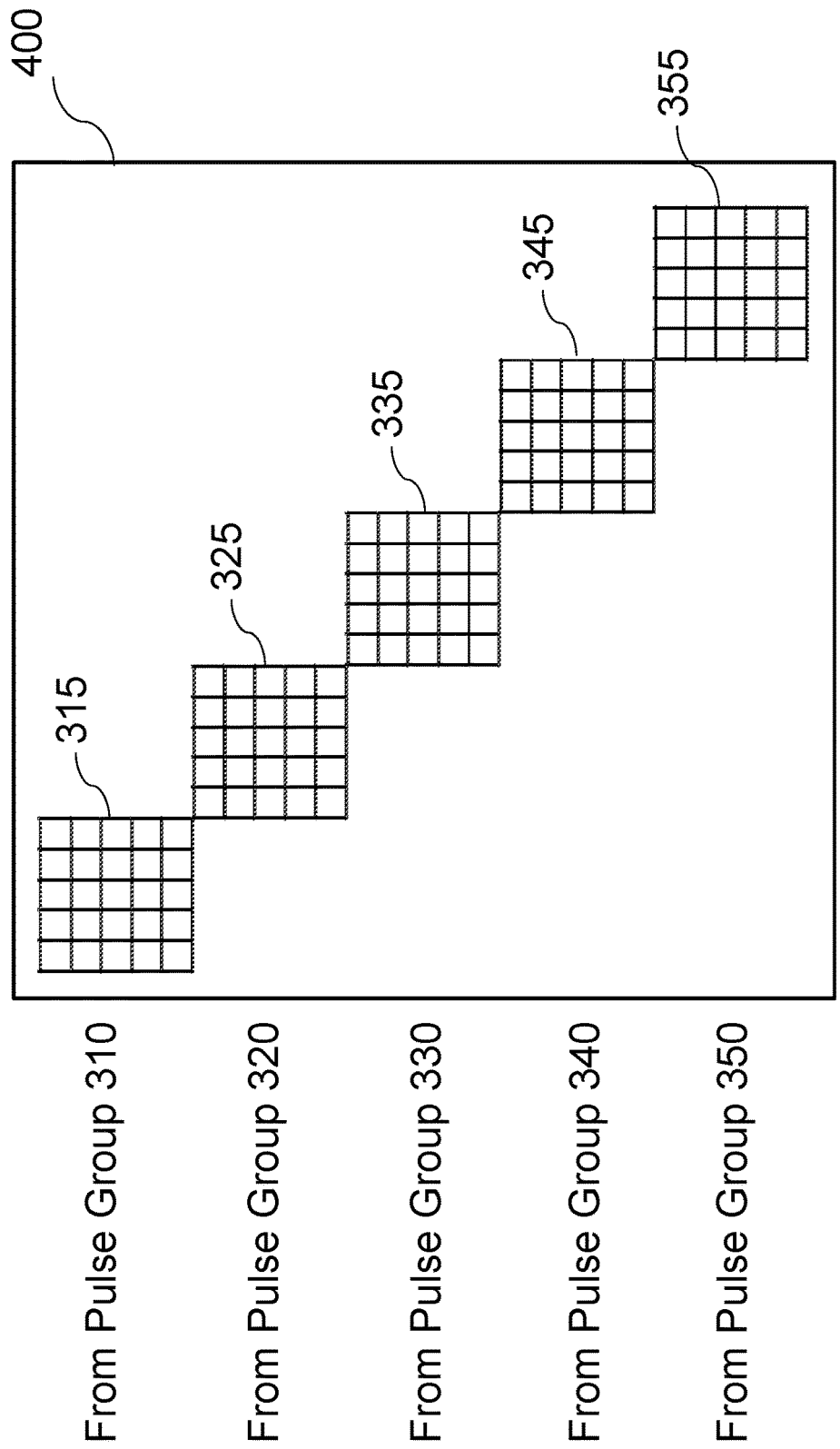
FIG. 4 shows an exemplified directory for the pulse groups shown in FIG. 3.

In some embodiments, referring to FIGS. 3 and 4, a plurality of pulse groups 310-350 can exchange their respective OWL matrices 315-355 to provide a global directory for all the nodes in the pulse groups 310-350. The form of the global directory is a partial mesh OWL matrix 400 as shown in FIG. 4. The partial mesh OWL matrix 400 is a table of OWL matrices 315-355, which can be used as the basis for algorithmic dynamic pulse group creation and for latency-based routing decisions.

For example, when a node A in pulse group 310 is attempting to send data to node B in pulse group 320, node A knows the public key of the destination node B and will inquire about node B at its genesis node in pulse group 310. The genesis node in pulse group 310 communicates with other Genesis nodes of the other pulse groups 320-350. Each of those Genesis nodes searches for the public key in their respective groups. The genesis node of pulse group 320 identifies node B using the public key and notifies the genesis node of pulse group 310 and node A.

To establish latency measurements between Node A and Node B, the genesis node of pulse group 320 can invite node A to join pulse group 320. The OWL matrix 325 is updated with latencies from and to node A, which allows calculations and determination of a better performing path from node A to node B. Alternatively, a new group can be formed that includes a hybrid of pulse group 310 and pulse group 320. The new group includes node A and node B as well as some or all other nodes previously in the two groups. An OWL matrix is established and updated as described above. A better performing path can be determined from node A to node B. It should be noted that the nodes in pulse group 310 and pulse group 320 can join the new group while still staying in their respective original pulse groups. In other words, each node can simultaneously join multiple pulse groups.

Figure 5:
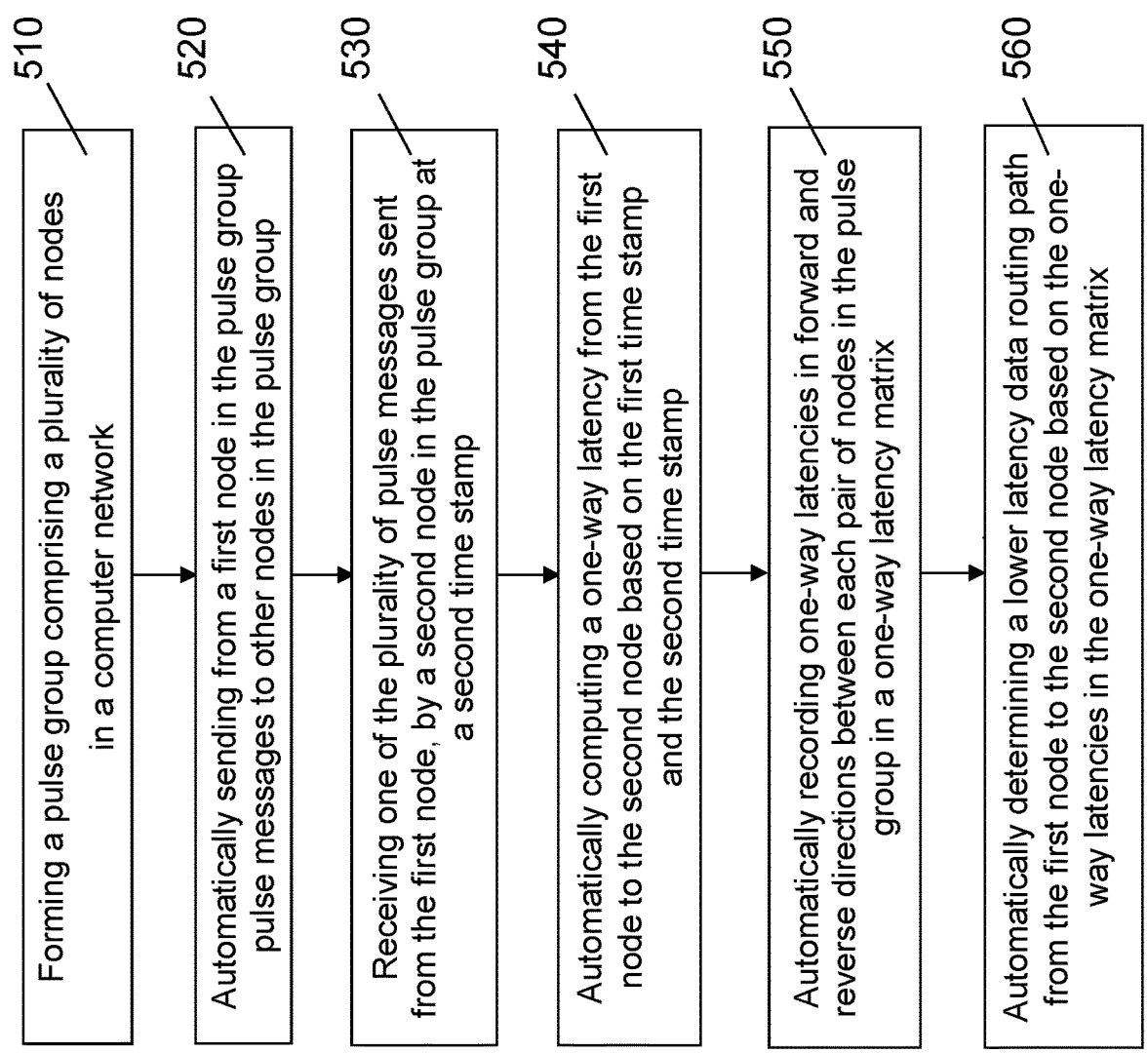
FIG. 5 is a flowchart showing the formation and operations of pulse groups in accordance with some embodiments of the present invention.

In some embodiments, the formation and operations of pulse groups can include one or more of the following steps. Referring to FIG. 5, a pulse group that includes a plurality of nodes in a computer network is formed (step 510). As described above, the plurality of nodes can first receive computer codes from a distributed routing controller. Once executed by nodes' respective computer processors (e.g. 117 in FIG. 1), instructions from the codes establish secure communications among the nodes. Pulse messages (or pulse messages) are automatically sent between nodes in the pulse group (step 520). The pulse message automatically sent from a first node to a second node in the pulse group (step 520) includes a first time stamp associated with the sending time of the specific pulse message. The pulse message is received by the second node at a reception time associated with a second time stamp (step 530).

Next, a one-way latency from the first node to the second node is automatically calculated based on the first time stamp and the second time stamp (step 540). In one implementation, the one-way latency from the first node to the second node is automatically calculated by the computer at the second node by subtracting the second time stamp by the first time stamp.

In some embodiments, the pulse message sent by a first node can further include reception times of the pulse messages previously received by the first node from other nodes in the pulse group. In this way, each node in the pulse group will have the first time stamp and the second time stamp of the pulse messages in both directions between that node and other nodes in the pulse group. The availability of the first time stamp and the second time stamp to the sending and the receiving nodes of the pulse messages allow the nodes to independently calculate latencies in both sending and receiving directions. The redundant calculations of the one-way latencies can serve as validation of OWL in the pulse group and ensure reliability of the OWL data in the OWL matrix.

The one-way latencies in both forward and reverse directions between each pair nodes in the pulse group are automatically recorded in a one-way latency matrix (step 550) by the nodes in the pulse group. These measured values are latencies for the direct paths between nodes in the pulse group. Specifically, the one-way latency from the first node to the second node in the one-way latency matrix can be updated by the second node after it calculates the updated one-way latency value as described above.

The OWL matrix is continually updated and shared in real time among all the nodes in the pulse group. For example, pulse messages can be sent by each node in the pulse group at a regular 1 second interval for the continued OWL measurements.

Using the one-way latencies updated in real time in the OWL matrix, a better performing data routing path with a lower latency from the first node to the second node can be automatically calculated (step 560). The better performing data routing path can include at least one relay node in the pulse group, a first transmission segment for the first node to the relay node, and a second transmission segment for the relay node to the second node. An example of such better performing data routing path is described above in the path from node C to node B and node B to node D in relation to FIG. 2. In some embodiments, there could be more than one relay node in the better performing data routing path. The total sum of latencies in all the segments in the better performing data routing path is lower than the latency of the direct path from the first node to the second node.

By managing the population of pulse groups, the disclosed systems and methods provide a buffer to the overall network load. Whenever or wherever a computer network is overburdened with traffic and experiencing high latencies, the disclosed systems and methods can autonomously identify alternative routing path and alleviate the traffic latency or congestion, which result in more consistency and reliability in the network's performance.

Details of the operations of pulse groups (steps 510-560 in FIG. 5) are now described. The computer codes downloaded from the distributed routing controller 105 and stored in the memory of each of the nodes in a pulse group (FIGS. 1 and 2) includes the same instructions and configuration information (i.e. defined by the distributed autonomous routing protocol) to be run on the nodes in the pulse groups. Once installed, the nodes in the same pulse group are instantly connected to other nodes in the pulse group over a secure connection.

Figure 6:
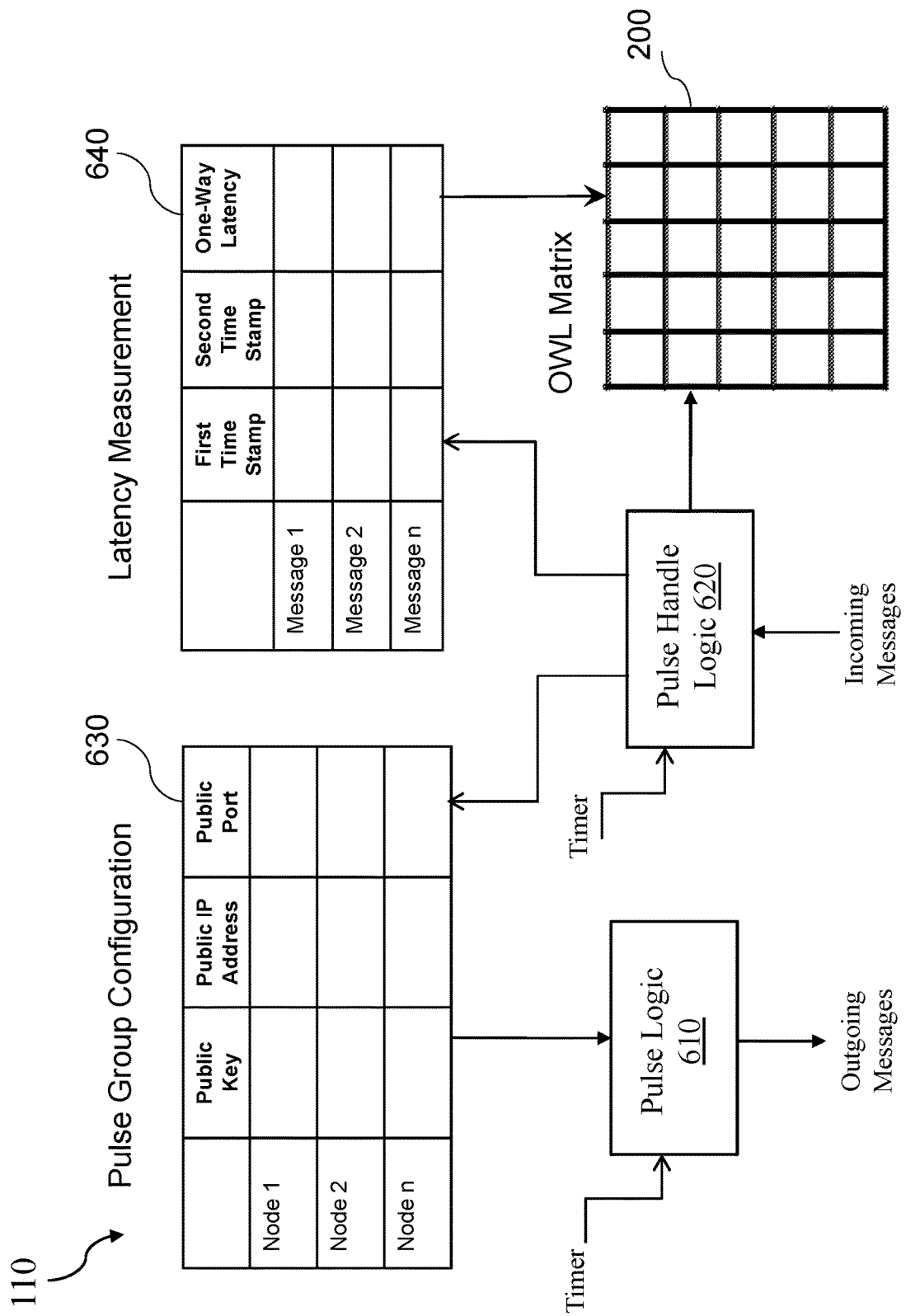
FIG. 6 illustrates detailed operations at a node in a pulse group in accordance with some embodiments of the present invention.

As shown in FIGS. 1A, 1B, and 6, a node (e.g. 110) in a pulse group receives computer codes from a distributed routing controller 105, which are installed on the node computer. The installed software enables the node computer to perform at least two logic functions: 1) Pulse Logic 610 for sending pulse messages to communicate state information to peer nodes in the same pulse group; and 2) Pulse Handle logic 620 for processing pulse messages (i.e. pulses) received from peer nodes within the pulse group.

The node computer stores a pulse group Configuration table 630 and a Latency measurement Table 640 among other information related to implementing the distributed autonomous routing protocol. The pulse group Configuration table 630 includes information about the nodes in the pulse group: public keys, public IP addresses, and public ports for the nodes in the pulse group. The information in this table ensures connections and communications between peer nodes in the same pulse group. For each message received by a receiving node in the pulse group, the Latency measurement Table 640 lists the first time stamp (i.e. the sending time recorded by the sending node), the second time stamp (i.e. the reception time recorded by the receiving node), and the one-way latency (OWL) calculated from the two time stamps.

Using the information in the pulse group Configuration table 630, the Pulse Logic 610 regularly sends out pulse messages to peer nodes in the same pulse group (using a public key assigned to a specific node at a specific public IP address via the specified public port). In each such pulse message, the Pulse Logic 610 records a time stamp according to the timer or the local clock of the node computer at node 110 and stores the time stamp in that pulse message. The time stamp serves as the first or the sending time stamp of the associated pulse message, which the node receiving the particular pulse message can use to calculate a one-way latency time from node 110 to the receiving node.

As discussed above, pulse messages can generally include information for operations of the pulse groups as well as for applications. Information for operations can include state information that is used for measurement purposes, that is, for recording time stamps and for calculating latencies. In some embodiments, pulse messages can carry information for identifying and communicating with the nodes in the same pulse group. Pulse messages can also include information that ensures consistent operations of the pulse groups such as latency measurements and routing path selections such as software version of the computer codes and/or docker version shared between nodes for executing the distributed autonomous routing protocol. Al nodes in a pulse group run the same version of software for the proper operations with the pulse group.

The Pulse Handle logic 620 can receive different types of messages. When a new node joins the pulse group, the Pulse Handle logic 620 receives information (i.e. the public key, the public IP address, and the public port for the new node) that instantiates the pulse group, and adds the information the pulse group Configuration table 630 (a new row for the node in 630).

Corresponding to the messages sent out, node 110 regularly receives pulse messages from peer nodes in the same pulse group. These received messages are also handled by Pulse Handle logic 620. For each received message, the Pulse Handle logic 620 records a second or a reception time stamp based on the timer or the clock of the local node computer. Pulse Handle logic 620 extracts the first (sending) time stamp from the received pulse message and records both the first time stamp and the second time stamp in the Latency measurement Table 640 for that message (e.g. message 1). Pulse Handle logic 620 then calculates a one-way latency (OWL) based on the first time stamp and the second time stamp. In one implementation, OWL is obtained by subtracting the first time stamp from the second time stamp. It should be noted, as described above, that the timer or the computer clock on node 110 may not be synchronized with the clocks on peer nodes 120-150 in the same pulse group. The clocks of the peer nodes can be skewed, or offset, such that the absolute OWL values may be different from the real latencies experienced in data transmission. The synchronicity however does not affect the determination of the better routing path.

As the OWL values are calculated from the received pulse messages, Pulse Handle logic 620 updates and records the current OWL values in the OWL matrix 200. In the specific configuration shown in OWL 200 (FIG. 2), Pulse Handle logic 620 in node 110 is responsible for updating a column of the OWL values, which includes latency values for the one-way messages received from different peer nodes in the same group. As discussed above in relation to FIGS. 2 and 5, better performing data routing paths can be determined using the most updated OWL matrix 200.

Figure 7:
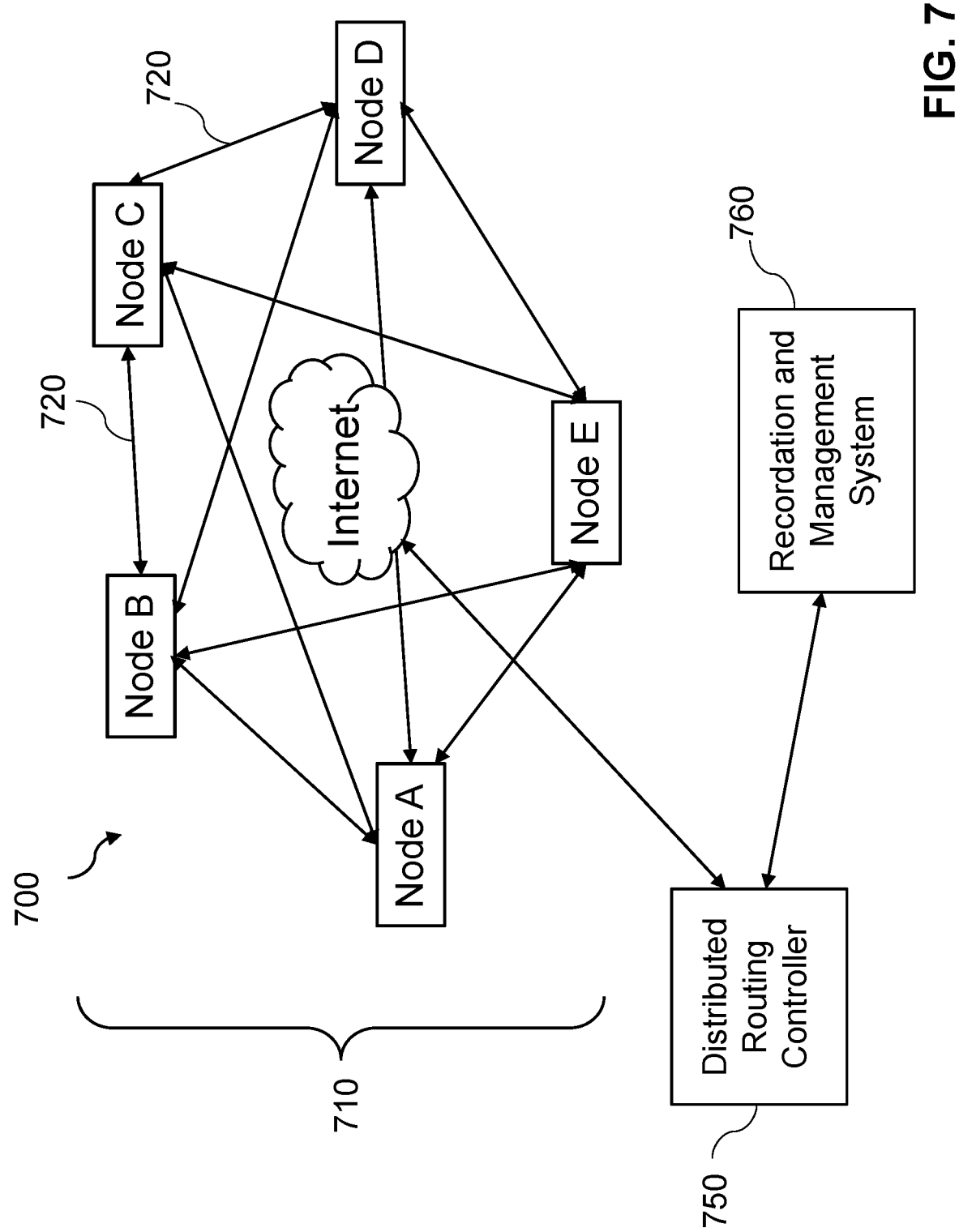
FIG. 7 shows a recordation and management system for facilitating better performing data routes between computer nodes in a pulse group in accordance with some embodiments of the present invention.

In some embodiments, referring to FIG. 7, in a computer network 700, a pulse group 710 is formed including node A, node B, node C, node D, and node E. The pulse group 710 is in communication with a distributed routing controller 750. In some embodiments, the distributed routing controller 750 can play a role in the initiation and ongoing management and performance of the pulse group 710. Similar to the functions of the genesis node described above, the distributed routing controller 750 can also initiate and form new a pulse group by sending Ping messages to nodes over a computer network (e.g. the Internet) and receiving messages from some nodes. In some embodiments, based on the analyses of the received messages, the distributed routing controller 105 can invite qualified nodes to join a new pulse group and an existing pulse group. The distributed routing controller 750 can periodically communicate a node (such as the genesis node) in a pulse group to receive the group's collective network state. The distributed routing controller 750 can convert performance matrices of pulse groups into a database of available data routing paths and their recently measured network performance characteristics.

As discussed above in connection with FIGS. 1A-2, 5, one-way latencies are continually measured between each pair of nodes A-E and recorded in an OWL matrix associated with the pulse group 710. A better performing data routing path can be determined between nodes (e.g. from node C to node D as shown in FIG. 2) in the pulse group 710. A recordation and management system 760 is in communication with the distributed routing controller 750 and the pulse group 710. After a data transmission has been conducted via one or more relay nodes along a better performing data routing path selected as described above, a payment is made by an entity (a digital wallet or an account) associated with the node that requested the data transfer to an entity (a digital wallet or an account) associated with the one or more relay nodes that provided the better performing data routing path. Such payment is defined in the distributed autonomous routing protocol that is installed on the nodes A-E and distributed by the distributed routing controller 750. The node that requested the data transfer is normally the node that sends the data or the node that receives the data. The recordation and management system 760 can record these payment transactions, which provide economic incentives for the participation of the nodes in the pulse groups and for serving as relay nodes. The recordation and management system 760 can also keep track of the better performing data routing paths in different pulse groups, and the ratings of nodes in different pulse groups.

Figure 8:
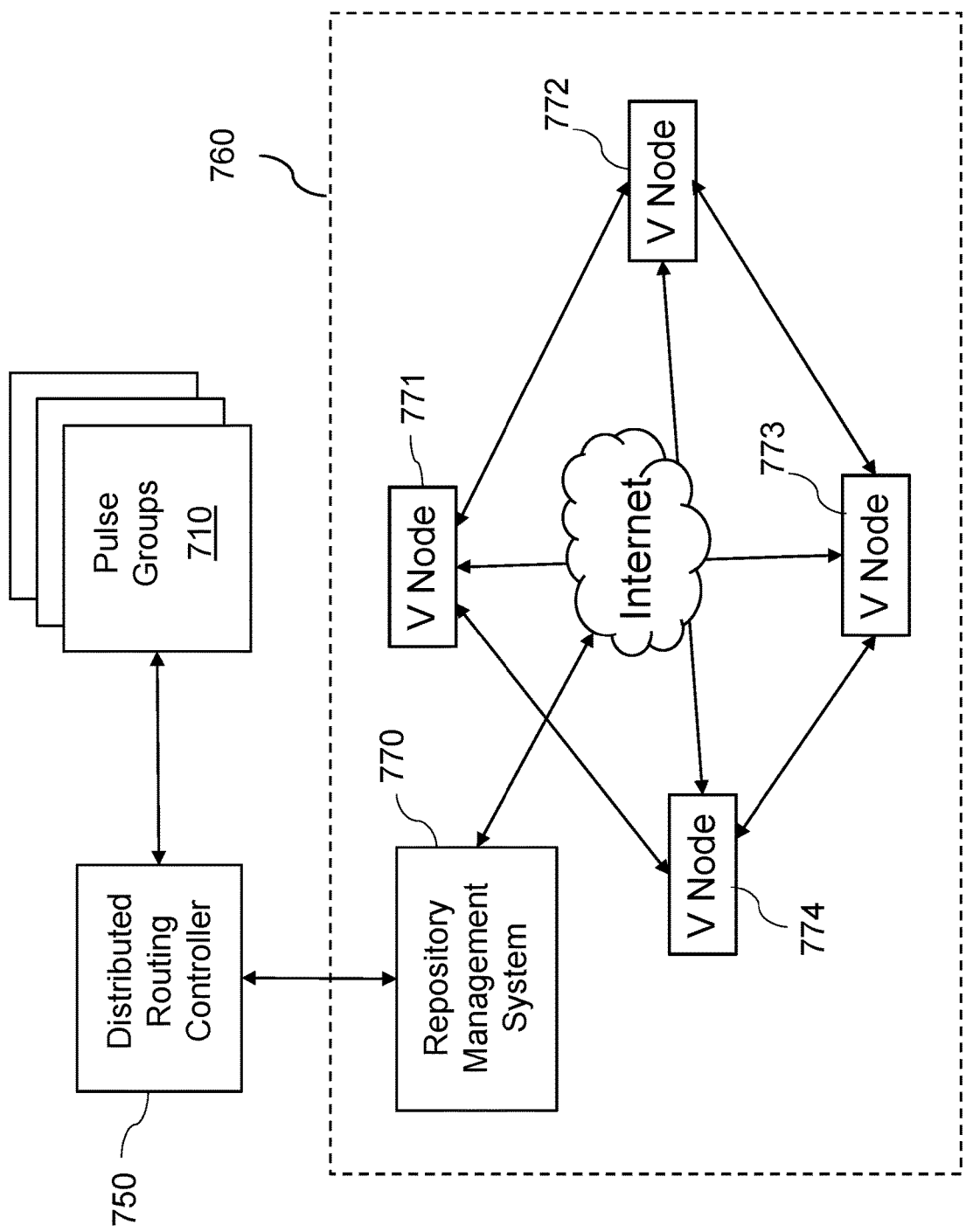
FIG. 8 shows details of an exemplified recordation and management system for facilitating compensations and credits for nodes that provide better performing data routes between computer nodes in a pulse group in accordance with some embodiments of the present invention.

In some embodiments, an exemplified implementation of the recordation and management system 760 is shown in FIG. 8. The recordation and management system 760 includes a repository management system 770 and validator nodes 771-774 (i.e. V-nodes). The repository management system 770 stores and manages historic data for the pulse groups: the roster of nodes in each pulse group, the one-way latency matrices recorded by different pulse groups, the available and selected routing paths, the performance characteristics (e.g. the amount of latencies reduced), and transactions made between nodes. These data is stored in a database in the repository management system 770.

The validator nodes 771-774 provide a distributed ledger to record the above described historic data including transactions between nodes in pulse groups. In general, the nodes in the pulse groups that serve as relay nodes for better data routing paths can considered as suppliers of distributed data routing resources. Those nodes that are in need of transmitting data can be considered as consumers of the distributed data routing resources. Additionally, the payment transfer between nodes in a pulse group does not need to involve direct data exchange between the two nodes. The two nodes can each own a digital wallet over the computer network or a Cloud. Payments can be made by one node to another by transfers (e.g. utility tokens) between their corresponding digital wallets.

Blockchain can be used to settle between the suppliers and the consumers of the collective resources of the distributed data routing in the pulse groups. The validator nodes 771-774 each includes a computer memory installed with blockchain codes and a processor executed the blockchain codes such that the validator nodes 771-774 can collectively validate and publish transactions between nodes in the pulse groups. Payments between nodes in pulse groups can be made in different forms, for example in utility tokens. Relay nodes of the better forming data routing paths can earn utility tokens from the nodes that will use or have used the better performing routing paths. Network data is continuously collected and stored by the distributed routing controller 750 in the form of a 'ticket' along with group statistics. The validator nodes 771-774 verify the network statistics that accompany the claim for reward, and add the transaction to the blockchain, which records the ledger of transfer of utility coins from the consumers to the suppliers for each use of alternative routing path selected as described above. The nodes A-E in the pulse group 710 can each have a digital wallet for storing utility tokens. Depending on their relative positions within data routing paths, each node can serve as a consumer or a supplier in a pulse group.

Moreover, referring to FIGS. 7 and 8, each node in the computer network 700 (FIG. 7) can simultaneously participate in multiple pulse groups and play the role of a consumer or a supplier in different pulse groups. Furthermore, a validator node 771-774 can also be a node (e.g. Node A-Node E) in a pulse group. In other words, a node in the computer network 700 can serve as a consumer or a supplier of resources of the distributed data routing as well as providing validating services for recording the transactions between the consumers and suppliers.

The validator nodes 771-774 can earn utility tokens for validating transactions under the rules of DARP as defined in the logics in the computer codes distributed among the validator nodes 771-774. These payments are receivable in the respective digital wallets of the validator nodes 771-774. For validating each transaction on the ledger, a validator node 771-774 can earn a small transaction fee, which is a small portion of the payment that a consumer pays for using a better-performing data route (most of payment goes to the supplier node(s) that provided the relay routing service). In addition, the validator nodes 771-774 can also earn dividend pool managed by the repository management system 770. The transaction revenues and dividends can ensure the stability and liquidity of the utility tokens, which in turn enable the availability and healthy usage of the distributed data routing resources in the disclosed distributed system and method.

Figure 9:
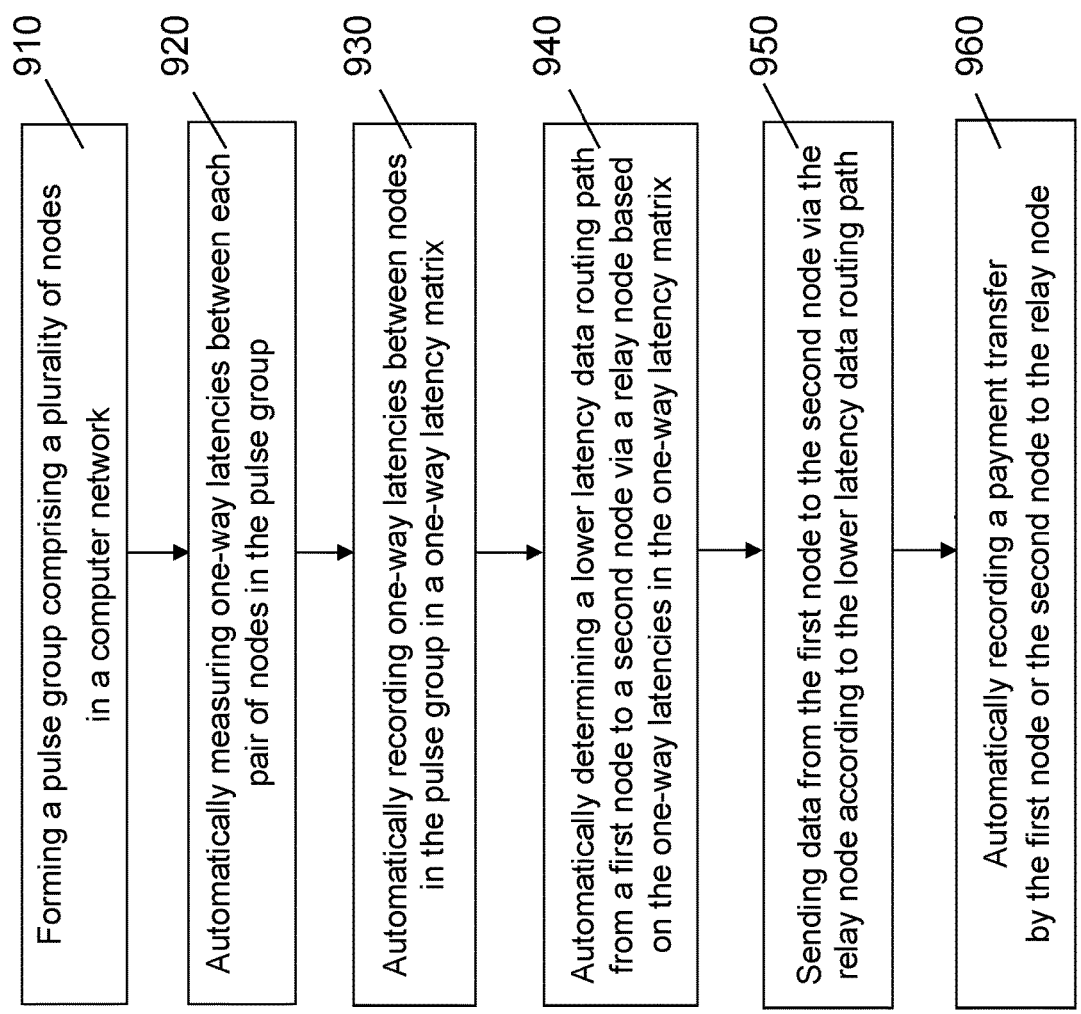
FIG. 9 is a flowchart for the formation of a pulse group, latency measurements and the selection of a better performing routing path in a pulse group, and the recordation of transactions for using and providing better performing data routes in accordance with some embodiments of the present invention.

The process of forming a pulse group, one-way latency measurements, the determination and selection of better performing data routing path, and the recording and payment transactions between nodes providing and using these routing paths can include one or more the following steps. Referring to FIG. 9 and FIGS. 7-8, with details described above (FIGS. 1A, 1B, 5, 6), a pulse group is formed by a plurality of nodes in a computer network (step 910). One-way latencies between each pair of nodes in the pulse group are automatically measured (step 920) continually (FIGS. 1A, 1B, 5, 6). One-way latencies are automatically recorded (FIGS. 1A-2, 5, 6) between nodes in the pulse group in a one-way latency matrix (step 930). A lower latency data routing path from a first node to a second node via a relay node is automatically determined (FIGS. 1A, 1B, 5, 6) based on the one-way latencies in the one-way latency matrix (step 940). According to the lower latency data routing path, data is sent from the first node to the second node via the relay node (step 950). A payment transfer from an entity (a digital wallet or an account) associated with the first node or the second node to an entity (a digital wallet or an account) associated with the relay node is automatically recorded (step 960) (FIGS. 7-8). As described in relation to FIG. 8 above, the payment transfer can be recorded on a ledger by a plurality of validator nodes using blockchain technologies.

Figure 10:
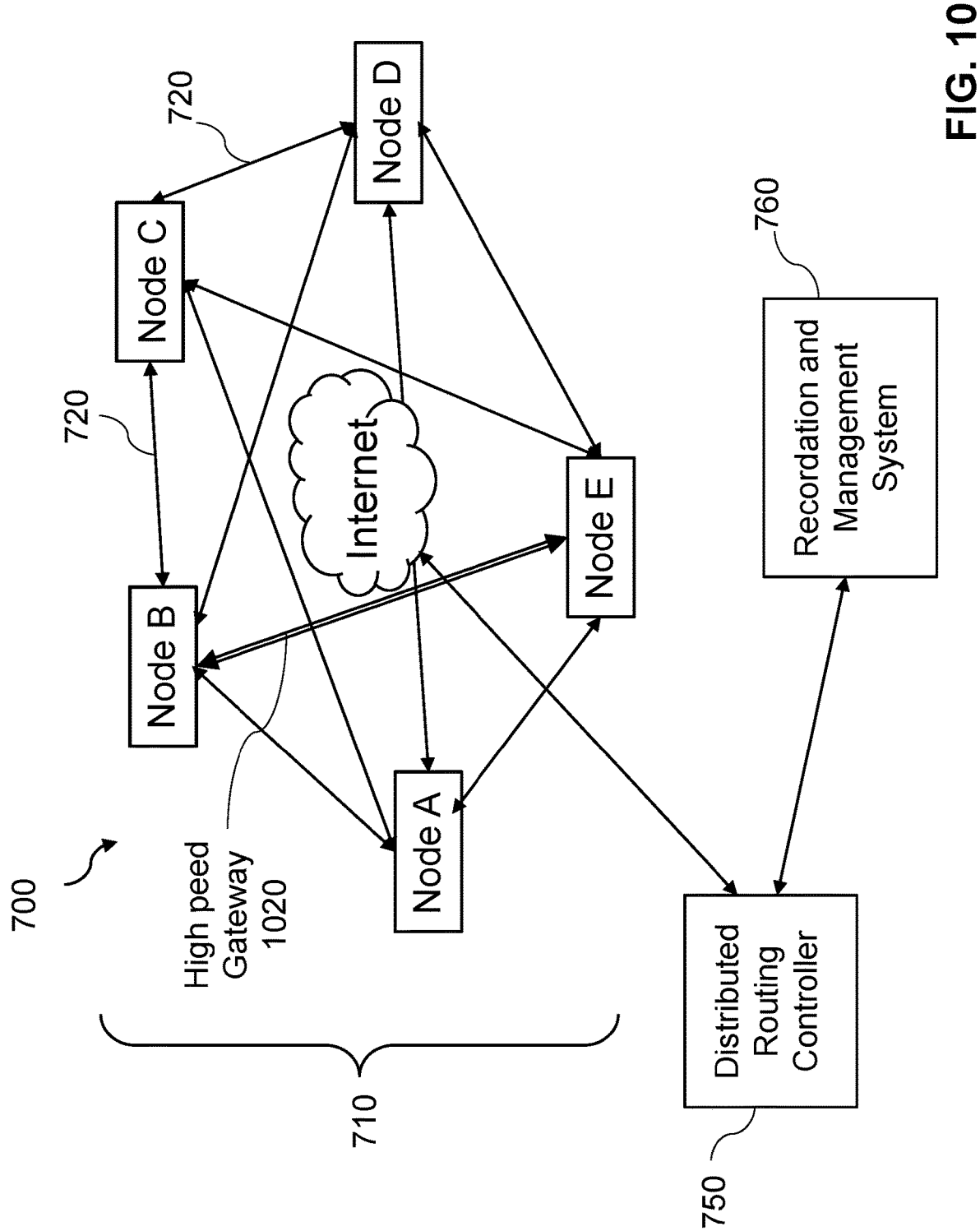
FIG. 10 shows a recordation and management system for facilitating better premium data routing services using high-speed data gateway in accordance with some embodiments of the present invention.
Figure 11:
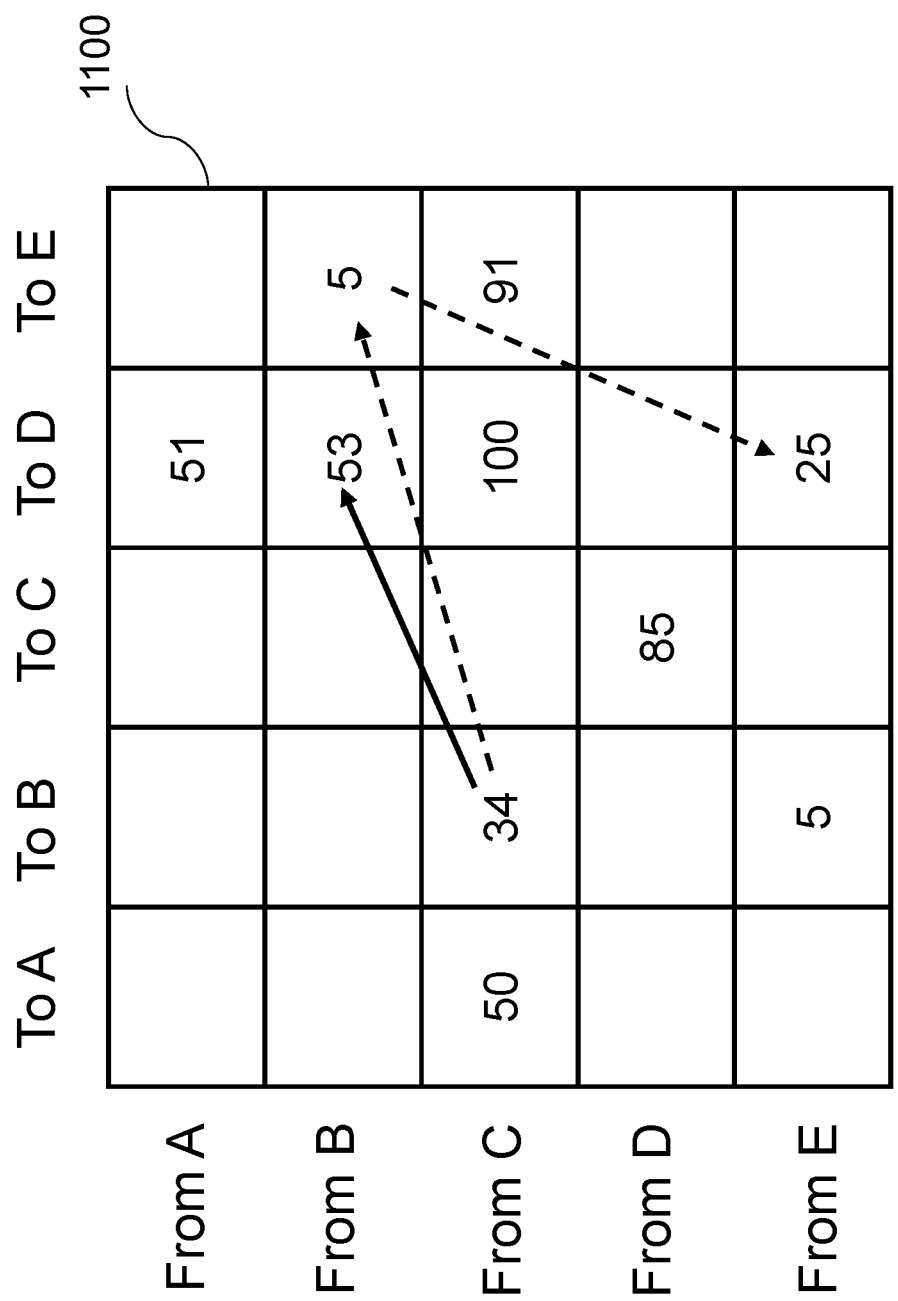
FIG. 11 is an exemplified one-way latency matrix associated with a pulse group and the selection of better performing data routing paths and a premium data routing path in relation to FIG. 10.

In some embodiments, a premium data routing service can be provided by high-speed data gateways. For example, certain high-speed data gateways have been constructed for stock and commodity trading. These high-speed data gateways are connected with secure sockets and are dedicated to trading activities during trading hours. Off peak hours, these high-speed gateways have a lot of excess bandwidth capacity that can be utilized to earn revenue in providing data routing to nodes participating the presently disclosed pulse groups under DARP. By high-speed data gateways and associated nodes, pulse groups can provide premium high-speed data routing paths that can drastically prove network routing performance. Referring to FIG. 10, the pulse group 710 is formed similar to that is shown in FIG. 7 except for node B and node E are connected by a high-speed data gateway 1020. Node B and node E are pre-stored with codes for DARP. They may be configured to participate and open up to join pulse groups only during certain hours. Referring to FIG. 11, the one-way latency measurements therefore include OWL values (5 msec.) from node B to node E and from node E to node B, which are both much lower than OWL values between other pairs of nodes. The one-way latencies between nodes on the high-speed data gateways are less than half, or less than 25%, of the average one-way latency value in a pulse group.

Still referring to FIG. 11 and similar to the discussion above in relation to FIG. 2, better performing data routing paths can be determined using an OWL matrix 1100. The conventional direct routing path from node C to node D has a latency of 100 msec. A better performing data routing path is found using node B as a relay node: the segments of node C to node B and then from node B to node D have a combined latency value of 34+53=87 msec. In the present example, an even better data routing path is found using the high-speed data gateway from node B to node E: a first segment from node C to node B, a second segment from node B to node E along the high-speed data gateway in between, and a third segment from node E to node D, which result in a combined latency value of 34+5+25=64 msec. The faster data routing path C-B-E-D represent a premium service enabled by the high-speed data gateway and the associated nodes B and E. When such premium service is used for data transfer, the node (e.g. C or D) that requested the data transmission from node C to node D will send a payment to an entity associated with the high-speed data gateway. These transactions are recorded by the recordation and management system 760.

One feature of the presently disclosed system and method is that they provide better-performing lower-latency data routing path comprising multiple relay nodes (multiple hops). For example, a high-speed data gateway is built up between New York and Chicago for stock and commodity trading. During off-peak hours, nodes connected to the high-speed gateway (e.g. node B and nod E in FIGS. 10 and 11) participate in pulse groups. They can initially participate in different pulse groups, respectively in neighborhoods of Chicago and New York. Using the directory service described above in relation to FIGS. 3 and 4, the initiation and destination nodes for a data transfer can form a new pulse group includes the high-speed data gateway (e.g. including node B and nod E in FIGS. 10 and 11).

It should be noted that because the OWL values are usually not identical in forward and reverse directions between a pair of nodes in a pulse group, the relayed better performing data routing paths are dependent on the specific sequence of the relay nodes along the data routing path. For example, although a hypothetic data routing path C-E-B-D also includes the high-speed data gateway with a low latency of 5 msec. from node E to node, the total latency for the path is: 91+5+53=148 msec., which does not result in a better performing data routing path.

It should be noted that one of the initiation node (e.g. node C in FIG. 11) or the destination node (e.g. node D in FIG. 11) can be connected to the high-speed data gateway. The better performing data routing path can include a segment on the high-speed data gateway connected to the initiation node or the destination node. For example, when a data transfer is requested from node C to node E, the direct routing path has 91 msec latency. A better performing routing path is found: node C to node B and node B to node E, with a total latency of 34+5=39 msec. The latter segment along a high-speed data gateway (between node B and node E).

In some embodiments, the pulse group 710 and the distributed routing controller 750 are configured to rank order possible data routing paths based on their respective performances such as the associated total latencies. The rank order function can be defined the distributed autonomous routing protocol contained the software distributed to Nodes A-E. Between two nodes in a pulse group, more than one better performing data routing path can be found. These better performing data routing paths can each be associated with different transaction charges. For example, a premium service provided by a high-speed data gateway can charge a higher transactional fee for its faster data routing pathway than other better performing data routing pathways. The nodes that requested data transmission (e.g. node C or D) can selected one of the better performing data routing pathways based on their relative performance (the total latency) and relative cost.

The process of providing a premium service using a high-speed data gateway in a pulse group can include one or more the following steps. Referring to FIG. 12 and FIGS. 10-11, a pulse group is formed by a plurality of nodes in a computer network (step 1210), with details described above (FIGS. 1A, 1B, 5, 6, 9). The pulse group includes at least two nodes connected by a high-speed gateway. One-way latencies between each pair of nodes in the pulse group are automatically measured continually (step 1220) (FIGS. 1A, 1B, 5, 6, 9), including those between the nodes connected by the high-speed gateway. One-way latencies are automatically recorded (FIGS. 1A-2, 5, 6, 9) between nodes in the pulse group in a one-way latency matrix (step 1230). The OWL values include those conducted along the high-speed gateway. The nodes connected by the high-speed gateway usually have much lower latency in between. A lower latency data routing path from a first node to a second node via a relay node is automatically determined (FIGS. 1A, 1B, 5, 6, 9) based on the one-way latencies in the one-way latency matrix (step 1240). According to the lower latency data routing path, data can be sent from the first node to the second node via the high-speed gateway (step 1250). Either the first node or the second node can request the data transfer and pay for the improved data routing service. A payment transfer from an entity (a digital wallet or an account) associated with the first node or the second node to an entity associated with the high-speed data gateway is automatically recorded (step 1260) (FIGS. 10-11). The entity associated with the high-speed data gateway can be node B or E or both, or an entity that manages or operates the high-speed data gateway. As described in relation to FIG. 8 above, the payment transfer can be recorded on a ledger by a plurality of validator nodes using blockchain technologies.

The above embodiments are only used to illustrate the technical solution of the present invention but not to limit it. Those skilled in the art can modify or equivalently replace the technical solution of the present invention without departing from the spirit and scope of the present invention. The scope of protection shall be subject to the claims.

What is claimed is:

1. A method for autonomously selecting data routing path over a computer network by a distributed system, comprising:
    forming a pulse group comprising a plurality of nodes in the computer network;
    automatically measuring one-way latencies between nodes in the pulse group, including a first one-way latency for a direct path from a first node to a second node, wherein automatically measuring the one-way latencies between the nodes in the pulse group comprises:
        automatically sending a plurality of pulse messages from the first node in the pulse group to other nodes in the pulse group;
        receiving one of the plurality of pulse messages by the second node in the pulse group, wherein the one of the plurality of pulse messages includes a first timestamp associated with a sending time by the first node, wherein the one of the plurality of pulse messages is received at a reception time associated with a second time stamp; and
        automatically computing the first one-way latency for the direct path from the first node to the second node based on the first time stamp and the second time stamp;
    automatically recording, in a one-way latency matrix, the one-way latencies between the nodes in the pulse group, wherein the first one-way latency is recorded in the one-way latency matrix;
    automatically determining a lower-latency data routing path from the first node to the second node based on the one-way latencies in the one-way latency matrix, wherein the lower-latency data routing path passes through a first relay node in the pulse group, wherein the lower-latency data routing path has a lower sum of one-way latencies from the first node to the second node via the first relay node than the first one-way latency, wherein at least some computer clocks at the plurality of nodes in the pulse group have skews relative to each other, wherein automatically determining the lower-latency data routing path from the first node to the second node is independent of the skews between the some of the computer clocks at the plurality of nodes in the pulse group; and
    sending data from the first node to the second node via the first relay node along the lower-latency data routing path, wherein a payment transfer is automatically recorded in response to sending data along the lower-latency data routing path.

2. The method of claim 1, wherein the payment transfer by the first node or the second node to the first relay node is automatically validated and recorded by a plurality of validator nodes using blockchain technologies.

3. The method of claim 1, wherein the lower-latency data routing path has a total latency defined by a sum of one-way latencies from the first node to the first relay node and from the first relay node to the second node.

4. The method of claim 1, wherein the pulse group includes a second relay node, wherein the lower-latency data routing path passes through the first replay node and the second relay node.

5. The method of claim 4, wherein the lower-latency data routing path has a total latency defined by a sum of one-way latencies from the first node to the first relay node, from first relay node to the second relay node, and from the second relay node to the second node.

6. The method of claim 4, wherein the first relay node and the second relay node are connected by a high-speed data gateway, wherein a one-way latency between the first relay node and the second relay node is less than half of an average of the one-way latency values in the pulse group.

7. The method of claim 1, wherein the first one-way latency from the first node to the second node is automatically computed at the second node, wherein the first one-way latency is automatically updated in the one-way latency matrix by the second node.

8. The method of claim 1, wherein the plurality of pulse messages are formed by single data packets.

9. The method of claim 1, wherein the pulse group is initiated by one of the plurality of nodes as a genesis node, the method further comprising:
    inviting nodes in the plurality of nodes by the genesis node to connect to the genesis node to form the pulse group.

10. A non-transitory computer-readable medium storing a plurality of instructions which, when executed by one or more processors, cause the one or more processors to perform operations a computer network, the operations comprising:
    forming a pulse group comprising a plurality of nodes in the computer network;
    automatically measuring one-way latencies between nodes in the pulse group, including a first one-way latency for a direct path from a first node to a second node, wherein automatically measuring the one-way latencies between the nodes in the pulse group comprises:
        automatically sending a plurality of pulse messages from the first node in the pulse group to other nodes in the pulse group;
        receiving one of the plurality of pulse messages by the second node in the pulse group, wherein the one of the plurality of pulse messages includes a first timestamp associated with a sending time by the first node, wherein the one of the plurality of pulse messages is received at a reception time associated with a second time stamp; and
        automatically computing the first one-way latency for the direct path from the first node to the second node based on the first time stamp and the second time stamp;
    automatically recording, in a one-way latency matrix, the one-way latencies between nodes in the pulse group, wherein the first one-way latency is recorded in the one-way latency matrix;
    automatically determining a lower-latency data routing path from the first node to the second node based on the one-way latencies in the one-way latency matrix, wherein the lower-latency data routing path passes through a first relay node in the pulse group, wherein the lower-latency data routing path has a lower sum of one-way latencies from the first node to the second node via the first relay node than the first one-way latency, wherein at least some computer clocks at the plurality of nodes in the pulse group have skews relative to each other, wherein automatically determining the lower-latency data routing path from the first node to the second node is independent of the skews between the some of the computer clocks at the plurality of nodes in the pulse group; and sending data from the first node to the second node via the first relay node along the lower-latency data routing path, wherein a payment transfer is automatically recorded in response to sending data along the lower-latency data routing path.

11. The non-transitory computer-readable medium of claim 10, wherein the payment transfer by the first node or the second node to the first relay node is automatically validated and recorded by a plurality of validator nodes using blockchain technologies.

12. The non-transitory computer-readable medium of claim 10, wherein the pulse group includes a second relay node, wherein the lower-latency data routing path passes through the first replay node and the second relay node.

13. The non-transitory computer-readable medium of claim 12, wherein the first relay node and the second relay node are connected by a high-speed data gateway, wherein a one-way latency between the first relay node and the second relay node is less than half of an average of the one-way latency values in the pulse group.

14. A computer system for autonomously selecting data routing path over a computer network, comprising:

a server configured to send instructions to a plurality of nodes in the computer network; and a memory storing the instructions that, when executed by the one or more processors at the plurality of nodes, cause the plurality of nodes to:

form a pulse group comprising a plurality of nodes in the computer network;

automatically measure one-way latencies between nodes in the pulse group, including a first one-way latency for a direct path from a first node to a second node, comprising:

automatically sending a plurality of pulse messages from the first node in the pulse group to other nodes in the pulse group;

receiving one of the plurality of pulse messages by the second node in the pulse group, wherein the one of the plurality of pulse messages includes a first timestamp associated with a sending time by the first node, wherein the one of the plurality of pulse messages is received at a reception time associated with a second time stamp; and automatically computing the first one-way latency for the direct path from the first node to the second node based on the first time stamp and the second time stamp;

automatically record, in a one-way latency matrix, the one-way latencies between nodes in the pulse group, wherein the first one-way latency is recorded in the one-way latency matrix;

automatically determine a lower-latency data routing path from the first node to the second node based on the one-way latencies in the one-way latency matrix, wherein the lower-latency data routing path passes through a first relay node in the pulse group, wherein the lower-latency data routing path has a lower sum of one-way latencies from the first node to the second node via the first relay node than the first one-way latency, wherein at least some computer clocks at the plurality of nodes in the pulse group have skews relative to each other, wherein automatically determining the lower-latency data routing path from the first node to the second node is independent of the skews between the some of the computer clocks at the plurality of nodes in the pulse group; and send data from the first node to the second node via the first relay node along the lower-latency data routing path, wherein a payment transfer is automatically recorded in response to sending data along the lower-latency data routing path.

15. The computer system of claim 14, wherein the payment transfer by the first node or the second node to the first relay node is automatically validated and recorded by a plurality of validator nodes using blockchain technologies.

16. The computer system of claim 14, wherein the pulse group includes a second relay node, wherein the lower-latency data routing path passes through the first replay node and the second relay node.

17. The computer system of claim 14, wherein the first relay node and the second relay node are connected by a high-speed data gateway, wherein a one-way latency between the first relay node and the second relay node is less than half of an average of the one-way latency values in the pulse group.

* * * * *